United States Patent [19]

Redmore et al.

[11] 4,235,838
[45] Nov. 25, 1980

[54] USE OF BENZAZOLES AS CORROSION INHIBITORS

[75] Inventors: Derek Redmore, Ballwin; Benjamin T. Outlaw, Webster Groves, both of Mo.

[73] Assignee: Petrolite Corporation, St. Louis, Mo.

[21] Appl. No.: 932,260

[22] Filed: Aug. 9, 1978

[51] Int. Cl.³ ............ C23F 11/04; C23F 11/14; C23F 11/16
[52] U.S. Cl. ............ 422/7; 252/8.55 E; 252/390; 252/392; 252/391; 422/12; 422/14; 422/16; 427/435
[58] Field of Search ............ 422/12, 14, 16, 7; 252/392, 8.55 E, 390, 391

[56] References Cited

U.S. PATENT DOCUMENTS

| | | | |
|---|---|---|---|
| 2,618,606 | 11/1952 | Schaeffer | 422/16 X |
| 2,819,284 | 1/1958 | Shem | 252/8.55 E X |
| 2,877,188 | 3/1959 | Liddell | 422/16 X |
| 2,963,433 | 12/1960 | Little et al. | 252/392 X |
| 3,252,914 | 5/1966 | Braunwarth et al. | 252/390 X |
| 3,450,646 | 6/1969 | Annand et al. | 252/8.55 E X |
| 3,778,376 | 12/1973 | Herber | 252/392 X |
| 3,872,096 | 3/1975 | Witte et al. | 252/392 X |
| 3,920,678 | 11/1975 | Butula | 252/390 X |
| 4,000,079 | 12/1976 | Rasp et al. | 252/391 X |
| 4,098,720 | 7/1978 | Hwa | 422/16 X |

*Primary Examiner*—Barry S. Richman
*Attorney, Agent, or Firm*—Sidney B. Ring; Hyman F. Glass

[57] ABSTRACT

Benzazoles of the general formula

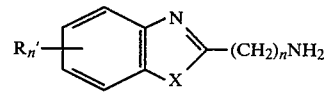

and derivatives thereof;
where $X = O$, S, NH and n is a number, for example 3–12 or greater, such as 3–5 or greater, and R is a substituted group, for example, a hydrocarbon or substituted hydrocarbon group, such as alkyl, etc. and n' is a number 0–3 or greater; and to use for such benzazoles as corrosion inhibitors.

14 Claims, No Drawings

USE OF BENZAZOLES AS CORROSION INHIBITORS

This invention relates to benzazoles of the general formula

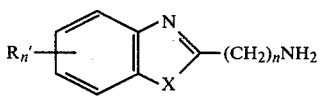

and to derivatives thereof.

One method of preparing these compounds involves reacting an aniline derivative with a lactam as described in A Botta, Annalen, 336 (1976) according to the equation

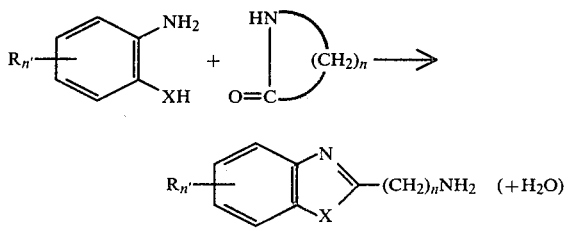

Examples of the type of benzazole ring structures include the following:

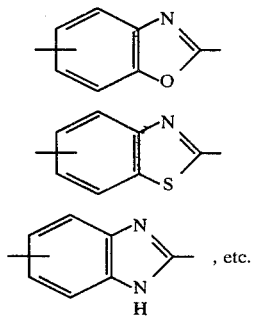

The benzazoles of this invention can be alkylated to form derivatives thereof.

Alkylation relates to the reaction of benzazoles with alkylating agents.

Any hydrocarbon halide, e.g. alkyl, alkenyl, cycloalkenyl, aralkyl, etc., halide which contains at least one carbon atom and up to about thirty carbon atoms or more per molecule can be employed to alkylate the products of this invention. It is especially preferred to use alkyl halides having between about one to about eighteen carbon atoms per molecule. The halogen portion of the alkyl halide reactant molecule can be any halogen atom, i.e., chlorine, bromine, fluorine, and iodine. In practice, the alkyl bromides and chlorides are used, due to their greater commercial availability. Non-limiting examples of the alkyl halide reactant are methyl chloride; ethyl chloride; propyl chloride; n-butyl chloride; sec-butyl iodide; n-butyl fluoride; n-amyl bromide; isoamyl chloride; n-hexyl bromide; n-hexyl iodide; heptyl fluoride; α-ethyl-hexyl chloride; n-octyl bromide; decyl iodide; dodecyl bromide; 7-ethyl-2-methyl-undecyl iodide; tetradecyl bromide; hexadecyl bromide; hexadecyl fluoride; heptadecyl chloride; octadecyl bromide; docosyl chloride; tetracosyl iodide; hexacosyl bromide; octacosyl chloride; and triacontyl chloride. In addition, alkenyl halides can also be employed, for example, the alkenyl halides corresponding to the above examples. In addition, the halide may contain other elements besides carbon and hydrogen as, for example, where dichloroethylether is employed.

The alkyl halides can be chemically pure compounds or of commercial purity. Mixtures of alkyl halides, having carbon chain lengths falling within the range specified hereinbefore, can also be used. Examples of such mixtures include chlorowaxes as set forth in U.S. Pat. No. 2,238,790.

Since the reaction between the alkyl halide reactant and the benzazole is a condensation reaction, or an alkylation reaction, the general conditions for such reactions are applicable herein. For certain uses it is preferable to carry out the reaction at temperatures of between about 100° and about 250° C., preferably between about 140° C. and about 200° C., in the presence of a basic material which is capable of reacting with the hydrogen halide to remove it. Such basic materials are, for example, sodium bicarbonate, sodium carbonate, pyridine, tertiary alkyl amines, alkali or alkaline earth metal hydroxides, and the like.

Alkylations are preferably carried out in polar solvent such as alcohols, dimethylsulfoxide, dimethyl formamide, nitrobenzene, etc. They are preferably carried out at temperatures of about 60°–120° C. The amount of solvent used is a variable and noncritical factor. It is dependent on the size of the reaction vessel and on the reaction temperature selected. For example, it will be apparent that the amount of solvent used can be so great that the reaction temperature is lowered thereby.

The time of reaction between the alkyl halide reactant and benzazole is dependent on the weight of the charge, the reaction temperature selected, and the means employed for removing the hydrogen halide from the reaction mixture. In practice, the reaction is continued until no more hydrogen halide is formed. In general, the time of reaction will vary widely such as between about one and about ten hours.

Thus, the term "alkylation" as employed herein and in the claims include alkenylation, cycloalkenylation, aralkylation, etc., and other hydrocarbonylation as well as alkylation itself.

The following are typical examples of alkylating agents: allyl chloride, benzyl chloride, methyl chloride, ethylene dichloride, 1,4-dichlorobutene-2, dimethyl sulfate, dodecylbenzene chloride, butyl chloride, dichlorodiethyl ether, 1,4 xylidene chloride and dodecenyl chloride.

In alkylation the terminal amino group is modified to form salts or quaternary groups, for example, where the R's may be the same or different

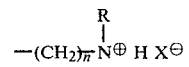

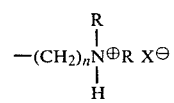

-continued

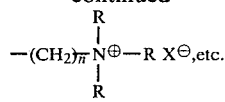

X represents any suitable anions such as a halide, i.e., Cl, Br, I, F, sulfate, sulfonate, etc.

It should be understood that other alkylating agents besides those containing halogens can be employed such as for example dialkylsulfates such as dimethyl sulfate, diethyl sulfate, etc., sulfonate esters such as methyl p-toluene-sulfonate, etc.

The following examples are presented for purposes of illustration and not of limitation.

EXAMPLE 1

2-(5-aminopentyl)benzimidazole.

A mixture of caprolactam (56.5 g; 0.5 mole) and o-phenylene diamine (54 g; 0.5 mole) was heated with p-toluene sulfonic acid (4.3 g; 0.025 mole) at 200°–225° for 7 hrs. under nitrogen. A quantitative yield of 2-(5-aminopentyl) benzimidazole was obtained.

Anal. Calcd. N. 20.66%; Found 18.16%.

EXAMPLE 2

2-(3-aminopropyl)benzimidazole

A mixture of 2-pyrrolidone (42.5 g; 0.5 mole) and o-phenylenediamine (54 g; 0.5 mole) was heated with p-toluenesulfonic acid (4.3 g) at 195°–207° for 6 hrs. while removing water (8.5 g) by distillation. A virtually quantitative yield of 2-(3-aminopropyl)benzimidazole was obtained.

EXAMPLE 3

2-(5-aminopentyl)benzoxazole

A mixture of caprolactam (56.5 g; 0.5 mole) o-aminophenol (53.5 g; 0.5 mole) and p toluenesulfonic acid (4.3 g) was heated at 185°–210° for 6 hrs while removing water by distillation. The product obtained in virtually quantitative was slightly impure 2-(5-aminopentyl)benzoxazole.

Anal. Calcd. N, 13.7%, Found 12.12%.

EXAMPLE 4

2-(3-aminopropyl)benzoxazole

In the manner of Example 3 2-pyrrolidone and o-aminophenol were converted into 2-(3-aminopropyl)benzoxazole.

EXAMPLE 5

2-(5-aminopentyl)benzothiazole

A mixture of caprolactam (62 g; 0.55 mole) and o-aminothiophenol (68.8; 0.55 mole) was heated with p-toluenesulfonic acid (4.3 g) at 190°–260° for 4½ hrs. while removing water by distillation. The product was essentially pure 2-(5-aminopentyl)benzothiazole.

Anal. Calcd. N, 12.7%, S, 14.5%, Found: N, 11.33%; S, 15.0%.

EXAMPLE 6

2-(3-aminopropyl)benzothiazole

By the procedure of Example 5, 2-pyrrolidone and o-aminothiophenol were converted into 2-(3-aminopropyl)benzothiazole.

EXAMPLE 7

2-(11-aminoundecyl)benzothiazole

In the manner of Example 5, 2-azacylotridecanone was reacted with o-aminothiophenol to yield 2-(11-aminoundecyl)benzothiazole.

Anal. Calc.: N, 9.2%, S, 10.52; Found, N, 8.24, S, 9.39.

EXAMPLE 8

2-(3-methylaminopropyl)-benzothiazole

The procedure of Example 5 was used to convert N-methylpyrrolidone and o-aminothiophenol into 2-(3-methylaminopropyl)benzothiazole.

Anal. Calcd.: N, 13.58, S, 15.52; Found, N, 11.85, S, 15.07.

EXAMPLE 9

2-(3-benzylaminopropyl)benzimidazole.

By the procedure of Example 2 N-benzylpyrrolidone was reacted with o-phenylenediamine to yield 2-(3-benzylaminopropyl)benzimidazole.

Anal. Calcd: N basic, 10.57%, Found 10.8%.

The following examples are prepared by alkylation of the heterocycles of Examples 1–9.

EXAMPLE 10

To the compound of Example 1 (0.2 mole) in ethanol (75 ml) was added methyl iodide (0.2 mole) and the solution heated at gentle reflux for 2 hours. Evaporation of the solvent gave the methylated product

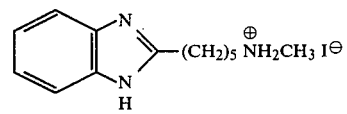

Anal Calcd. I⊖, 36.7%; Found: I⊖, 35.3%.

The following examples used the above alkylation procedure:

| Example | Heterocycle | Alkylating Reagent | Product Analysis Found | Calculated |
|---------|-------------|--------------------|-----------------------|------------|
| 11 | Example 2 | CH₃I | I⁻,36.4% | I⁻, 40.0% |
| 12 | Example 4 | CH₃I | I⁻,35.3% | I⁻, 41.4% |
| 13 | Example 6 | PhCH₂Cl | Cl⁻,9.8% | Cl⁻, 10.9% |
| 14 | Example 6 | (CH₃)₂SO₄ | S, 18.3% | S, 18.5% |
| 15 | Example 6 | CH₃I | I⁻,31.9% | I⁻, 37.9% |
| 16 | Example 5 | PhCH₂Cl | Cl⁻,11.3% | Cl⁻, 10.1% |
| 17 | Example 5 | CH₃I | I⁻,34.3% | I⁻, 35.2% |
| 18 | Example 3 | CH₃I | I⁻,35.0% | I⁻, 36.7% |
| 19 | Example 3 | PhCH₂Cl | Cl⁻,9.7% | Cl⁻,10.6% |
| 20 | Example 1 | PhCH₂Cl | | |

EXAMPLE 21

2-(3-dimethylaminopropyl)benzothiazole

The benzothiazole of Example 2 (0.25 mole) was reacted with dimethylsulfate (0.25 mole) and then basified. The methylation step was repeated with dimethylsulfate (0.25 mole) followed by basification allowing isolation of 2-(3-dimethylaminopropyl)benzothiazole.

EXAMPLE 22

Quaternary derivative from Example 21

The product of Example 21 (0.15 mole) was treated with dimethyl sulfate in benzene. After removal of solvent the quaternary product was obtained.

Anal. Calcd.: N, 8.09; S, 18.5. Found: N, 7.55; S, 18.3.

USE AS CORROSION INHIBITORS

This phase of this invention relates to the use of the present compounds in inhibiting the corrosion of metals, most particularly iron, steel and ferrous alloys. These compounds can be used in a wide variety of applications and systems where iron, steel and ferrous alloys are affected by corrosion. They may be employed for inhibiting corrosion in processes which require this protective or passivating coating as by dissolution in the medium which comes in contact with the metal. They can be used in preventing atmospheric corrosion, underwater corrosion, corrosion in steam and hot water systems, corrosion in chemical industries, underground corrosion, etc.

The corrosion inhibitors contemplated herein find special utility in the prevention of corrosion of pipe or equipment which is in contact with a corrosive oil-containing medium, as, for example, in oil wells producing corrosive oil or oil-brine mixtures, in refineries, and the like. These inhibitors may, however, be used in other systems or applications. They appear to possess properties which impart to metals resistance to attack by a variety of corrosive agents, such as brines, weak inorganic acids, organic acids, $CO_2$, $H_2S$, etc.

The method of carrying out this process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, organic acids and the like. For the protection of such wells, the reagent, either undiluted or dissolved in a suitable solvent, is fed down the annulus of the well between the casing and the producing tubing where it becomes comingled with the fluid in the well and is pumped or flowed from the well with these fluids, thus contacting the inner wall of the casing, the outer and the inner wall of tubing, and the inner surface of all wellhead fittings, connections and flow lines handling the corrosive fluid.

Where the inhibitor composition is a liquid, it is conventionally fed into the well annulus by means of a motor driven chemical injector pump, or it may be dumped periodically (e.g., once every day or two) into the annulus by means of a so-called "boleweevil" device or similar arrangement. Where the inhibitor is a solid, it may be dropped into the well as a solid lump or stock, it may be blown in as a powder with gas, or it may be washed in with a small stream of the well fluids or other liquid. Where there is gas pressure on the casing, it is necessary, of course, to employ any of these treating methods through a pressure equalizing chamber equipped to allow introduction of reagent into the chamber equalization of pressure between chamber and casing, and travel of reagent from chamber to well casing.

Occasionally, oil and gas wells are completed in such a manner that there is no opening between the annulus and the bottom of the tubing. This results, for example, when the tubing is surrounded at some point by a packing held by the casing or earth formation below by the casing. In such wells the reagent may be introduced into the tubing through a pressure equalizating vessel, after stopping the flow of fluids. After being so treated the well should be left closed in for a period of time sufficient to permit the reagent to drop to the bottom of the well.

For injection into the well annulus, the corrosion inhibitor is usually employed as a solution in a suitable solvent. The selection of solvent will depend much upon the exact reagent being used and its solubility characteristics.

For treating wells with packed-off tubing, the use of solid "sticks" or plugs of inhibitor is especially convenient. These may be prepared by blending the inhibitor with a mineral wax, asphalt or resin in a proportion sufficient to give a moderately hard and high-melting solid which can be handled and fed into the well conveniently.

The protective action of the herein described reagents appears to be maintained for an appreciable time after treatment ceases, but eventually is lost unless another application is made.

For example, for the protection of gas wells and gas-condensate wells, the amount of corrosion inhibitor used might range between about $\frac{1}{4}$ to 3 lbs. more per million cubic feet of gas produced, depending upon the amounts and composition of corrosive agents in the gas and the amount of liquid hydrocarbon and water produced. However, in no case does the amount of inhibitor required appear to be stoichiometrically related to the amount of acids produced by a well, since protection is obtained with much less corrosion inhibitor than usually would be required for neutralization of the acids produced.

These compositions are particularly effective in the prevention of corrosion in systems containing a corrosive aqueous medium, and most particularly in systems containing brines.

These compounds can also be used in the prevention of corrosion in the secondary recovery of petroleum by water flooding and in the disposal of waste water and brine from oil and gas wells. Still more particularly, they can be used in a process of preventing corrosion in water flooding and in the disposal of waste water and brine from oil and gas wells which is characterized by injecting into an underground formation an aqueous solution containing minor amounts of the compositions of this invention, in sufficient amounts to prevent the corrosion of metals employed in such operation.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the water flooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration this type of water flooding system is referred to herein as an "open water flooding system." If the water is recirculated in a closed system without substantial aeration, the secondary recovery method is referred to herein as a "closed water flooding system."

Because of the corrosive nature of oil field brines, to economically produce oil by water flooding, it is necessary to prevent or reduce corrosion since corrosion increases the cost thereof by making it necessary to repair and replace such equipment at frequent intervals. These compositions can be employed in preventing corrosion in systems containing a corrosive aqueous media, and most particularly in systems containing brine, which is characterized by employing the benzazoles compounds described herein. For example, they can be employed in an improved process of protecting from corrosion metallic equipment employed in secondary oil recovery by water flooding such as injection wells, transmission lines, filters, meters, storage tanks, and other metallic implements employed therein and particularly those containing iron, steel, and ferrous alloys, such process being characterized by employing in water flood operation an aqueous solution of the compositions of this invention.

In many oil fields large volumes of water are produced and must be disposed of where water flooding operations are not in use or where water flooding operations cannot handle the amount of produced water. Most States have laws restricting pollution of streams and land with produced waters, and oil producers must then find some method of disposing of the waste produced salt water. In many instances therefore, the salt water is disposed by injecting the water into permeable low pressure strata below the fresh water level. The formation into which the water is injected is not the oil producing formation and this type of disposal is defined as salt water disposal or waste water disposal. The problems of corrosion of equipment are analagous to those encountered in the secondary recovery operation by flooding. The compositions of this invention can also be used in such water disposal walls this providing a simple and economical method of solving the corrosion problems encountered in disposing of unwanted water.

Water flood and waste disposal operations are too well known to require further elaboration. In essence, the flooding operation is effected in the conventional manner except that the flooding medium contains a minor amount of these compounds, sufficient to prevent corrosion.

While the flooding medium employed in accordance with the present invention contains water or oil field brine and the compounds of this invention, the medium may also contain other materials. For example, the flooding medium may also contain other agents such as surface active agents or detergents which aid in wetting throughout the system and also promote the desorption of residual oil from the formation, sequestering agents which prevent the deposition of calcium and/or magnesium compounds in the interstices of the formation, bacteriocides which prevent the formation from becoming plugged through bacterial growth, tracers, etc. Similarly, they may be employed in conjunction with any of the operating techniques commonly employed in water flooding, peripheral flooding, etc. and in conjunction with other secondary recovery methods.

The concentration of the corrosion inhibitors of this invention will vary widely depending on the particular compound, the particular system, etc. Concentrations of at least about 0.25 ppm, such as about 0.75 to 7,500 ppm for example about 1 to 5,000 ppm, advantageously about 10 to 1,000 ppm, but preferably about 15–250 ppm may be employed. Larger amounts can also be employed such as 1.5–5.0% although there is generally no commercial advantage in so doing.

For example, since the success of a water flooding operation manifestly depends upon its total cost being less than the value of the additional oil recovered from the oil reservoir, it is quite important to use as little as possible of these compounds consistent with optimum corrosion inhibition.

Since these compounds are themselves inexpensive and are used in low concentrations, they enhance the success of a flood operation by lowering the cost thereof.

By varying the constituents of the composition, the compounds of this invention can be made more oil or more water soluble, depending on whether the composition is to be employed in oil or water systems.

These compounds can also be employed in conjunction with other corrosion inhibitors, for example, of the film forming type. Non-limiting examples include the acylated polyamines such as described in U.S. Pat. Nos. Re. 23,227, 2,466,517, 2,468,163, 2,598,213 and 2,640,029. These acylated polyamines may be described as amides, imidazolines, tetrahydropyrimidines, etc.

Corrosion Test Results

Corrosion tests were carried out at ambient temperature in 2% sodium chloride saturated with carbon dioxide. Corrosion rates were measured using PAIR meter of the type described in U.S. Pat. No. 3,406,101. Inhibitors were injected after the electrodes had been allowed to corrode for 2 hours.

| Compound | Concentration (ppm) | Corrosion Rate (mpy) | Protection |
| --- | --- | --- | --- |
| Blank | — | 51 | — |
| Example 5 | 15 | 14.4 | 75% |
| Example 5 | 125 | 10.2 | 82% |
| Example 6 | 30 | 17.9 | 65% |
| Example 6 | 125 | 7.6 | 85% |
| Example 16 | 15 | 27.4 | 52% |
| Example 16 | 125 | 18.2 | 68% |
| Example 17 | 30 | 29.6 | 48% |
| Example 17 | 1000 | 8.4 | 85 |
| Example 20 | 125 | 45.0 | 12% |
| Example 21 | 125 | 13.3 | 74% |
| Example 21 | 250 | 10.3 | 80% |
| Example 22 | 125 | 21.2 | 68% |
| Example 22 | 15 | 26.3 | 54% |

Protection is calculated in the usual manner from corrosion rate ($R_1$) of fluids without inhibitor and corrosion rate ($R_2$) in presence of particular inhibitor according to the formula $$\frac{R_1 - R_2}{R_1} \times 100 = \text{Percent protection.}$$

We claim:

1. A process of inhibiting or preventing the corrosion of a metal selected from the group consisting of iron and ferrous alloys in a corrosive system which consists essentially of treating said system with a corrosion inhibiting amount of a benzazole as the sole corrosion inhibitor, said benzazole having an alkylene amino group side chain on the number 2 position on the heterocyclic moiety.

2. The process of claim 1 where the systems being treated are oil or gas well systems.

3. The process of claim 1 where the system is treated by first applying the corrosion inhibitor to the metal surfaces.

4. The process of claim 1 where the system is treated by dissolving the corrosion inhibitor in the corrosive medium and keeping the solution in contact with the metal surfaces.

5. The process of claim 1 where the benzazole unit is a benzimidazole, a benzoxazole, or a benzothiazole.

6. The process of claim 5 where the side chain is
$-(CH_2)_n NH_2$ where n=3-5.

7. The process of claim 6 where the amino group is alkylated with a hydrocarbon group.

8. The process of claim 7 where the hydrocarbon group is alkyl or benzyl.

9. The process of claim 6 where n=3.

10. The process of claim 9 where the amino group is alkylated with a hydrocarbon group.

11. The process of claim 10 where the hydrocarbon group is alkyl or benzyl.

12. The process of claim 9 where the benzazole is benzothiazole.

13. The process of claim 12 where the amino group is alkylated with a hydrocarbon group.

14. The process of claim 13 where the hydrocarbon group is alkyl or benzyl.

* * * * *